United States Patent
Cheadle et al.

(10) Patent No.: US 9,615,266 B1
(45) Date of Patent: Apr. 4, 2017

(54) NETWORKING DEVICE WITH AN ELECTRONICALLY STEERABLE DIRECTIONAL ANTENNA ARRAY

(71) Applicant: Cisco Technology, Inc., San Jose, CA (US)

(72) Inventors: Christopher A. Cheadle, Saratoga, CA (US); Steven Anthony Granzella, Saratoga, CA (US); John A. Bentley, Santa Clara, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 15/089,836

(22) Filed: Apr. 4, 2016

(51) Int. Cl.
  *H01Q 21/00* (2006.01)
  *H04W 16/28* (2009.01)
  *H04W 16/26* (2009.01)
  *H01Q 3/26* (2006.01)

(52) U.S. Cl.
  CPC .......... *H04W 16/28* (2013.01); *H01Q 3/2623* (2013.01); *H01Q 3/2629* (2013.01); *H01Q 3/2635* (2013.01); *H04W 16/26* (2013.01)

(58) Field of Classification Search
  CPC .... H04W 16/28; H04W 16/26; H01Q 3/2629; H01Q 3/2623; H01Q 3/2635
  USPC ..... 455/272, 562.1; 343/725, 729, 776, 844, 343/879, 893
  See application file for complete search history.

(56) References Cited

U.S. PATENT DOCUMENTS

| | | | |
|---|---|---|---|
| 6,728,554 B1 | 4/2004 | Wegner | |
| 7,120,468 B1 | 10/2006 | Wilhoyte et al. | |
| 7,136,023 B2 * | 11/2006 | Reykowski | G01R 33/365 324/318 |
| 8,412,106 B2 | 4/2013 | da Silva et al. | |
| 9,001,803 B2 | 4/2015 | Bollea et al. | |
| 2003/0003883 A1 * | 1/2003 | Wallace et al. | H01Q 3/26 455/115.1 |
| 2004/0157645 A1 | 8/2004 | Smith et al. | |
| 2009/0028112 A1 * | 1/2009 | Attar et al. | H04W 36/245 370/332 |
| 2014/0126354 A1 * | 5/2014 | Hui et al. | H04L 29/14 370/225 |
| 2015/0085830 A1 * | 3/2015 | Nozaki et al. | H04W 40/00 370/332 |
| 2015/0195126 A1 * | 7/2015 | Vasseur et al. | H04L 41/5025 370/218 |
| 2015/0304118 A1 * | 10/2015 | Janneteau et al. | H04L 45/02 370/312 |

OTHER PUBLICATIONS

Jeffrey Herd "Phased Array Radar Basics" MIT Lincoln Laboratory; Nov. 17, 2009; p. 1-17.

* cited by examiner

*Primary Examiner* — Dominic Rego
(74) *Attorney, Agent, or Firm* — Parker Ibrahim & Berg LLC; James M. Behmke; Stephen D. LeBarron (57) ABSTRACT

In one embodiment, a networking device comprises a first plurality of antenna means, a second plurality of antenna means, and means for controlling the first and second pluralities of antenna means to direct a communication towards a neighbor node of the device.

18 Claims, 12 Drawing Sheets

NETWORKING DEVICE WITH AN ELECTRONICALLY STEERABLE DIRECTIONAL ANTENNA ARRAY

TECHNICAL FIELD

The present disclosure relates generally to computer networks, and, more particularly, to a networking device with an electronically steerable directional antenna array.

BACKGROUND

Low-Power and Lossy Networks (LLNs), e.g., sensor networks, have a myriad of applications, such as Smart Grid and Smart Cities. Various challenges are presented with LLNs, such as lossy links, low bandwidth, battery operation, low memory and/or processing capability of a device, etc. Changing environmental conditions may also affect device communications. For example, physical obstructions (e.g., changes in the foliage density of nearby trees, the opening and closing of doors, etc.), changes in interference (e.g., from other wireless networks or devices), propagation characteristics of the media (e.g., temperature or humidity changes, etc.), and the like, also present unique challenges to LLNs.

Given the distributed nature of LLN devices, many LLN implementations make use of range extenders, to service remote endpoints. Notably, adding a range extender is significantly less costly than adding another field area router to the network and range extenders also do not require Ethernet connections. Traditionally, however, range extender designs use either an omnidirectional antenna or two directional antennas. In the latter case, the signal must be split between the two antennas, thereby reducing the transmission power and reception sensitivity of the extender. If more than two endpoints exist, additional directional antennas may be added to the extender, but at the cost of further reducing the transmit power and sensitivity of the extender, due to the additional signal splitting required to feed the additional antennas.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

According to one or more embodiments of the disclosure, a networking device includes a housing, a first plurality of antenna elements coupled to a top or bottom edge of the housing that are continuously enabled, and a second plurality of antenna elements coupled to the top or bottom edge of the housing that are selectively enabled. The networking device further includes control circuitry coupled to the first and second pluralities of antenna elements. The control circuitry is configured to select a first communication direction towards a first neighboring node of the device. The first communication direction is associated with a first subset of the second plurality of antenna elements. The control circuitry is also configured to enable the first subset of the second plurality of antenna elements based on the selected first communication direction. The control circuitry is additionally configured to receive a communication from the first neighboring node. The control circuitry is also configured to select a second communication direction towards a second neighboring node of the device. The second communication direction is associated with a second subset of the second plurality of antenna elements. The control circuitry is further configured to enable the second subset of the second plurality of antenna elements based on the selected second communication direction. The control circuitry is also configured to send the communication towards the second neighboring node via the enabled first plurality of antenna elements and the enabled second subset of the second plurality of antenna elements.

Description

A computer network is a geographically distributed collection of nodes interconnected by communication links and segments for transporting data between end nodes, such as personal computers and workstations, or other devices, such as sensors, etc. Many types of networks are available, ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), synchronous digital hierarchy (SDH) links, or Powerline Communications (PLC) such as IEEE 61334, IEEE P1901.2, and others. In addition, a Mobile Ad-Hoc Network (MANET) is a kind of wireless ad-hoc network, which is generally considered a self-configuring network of mobile routers (and associated hosts) connected by wireless links, the union of which forms an arbitrary topology.

Figure 1:
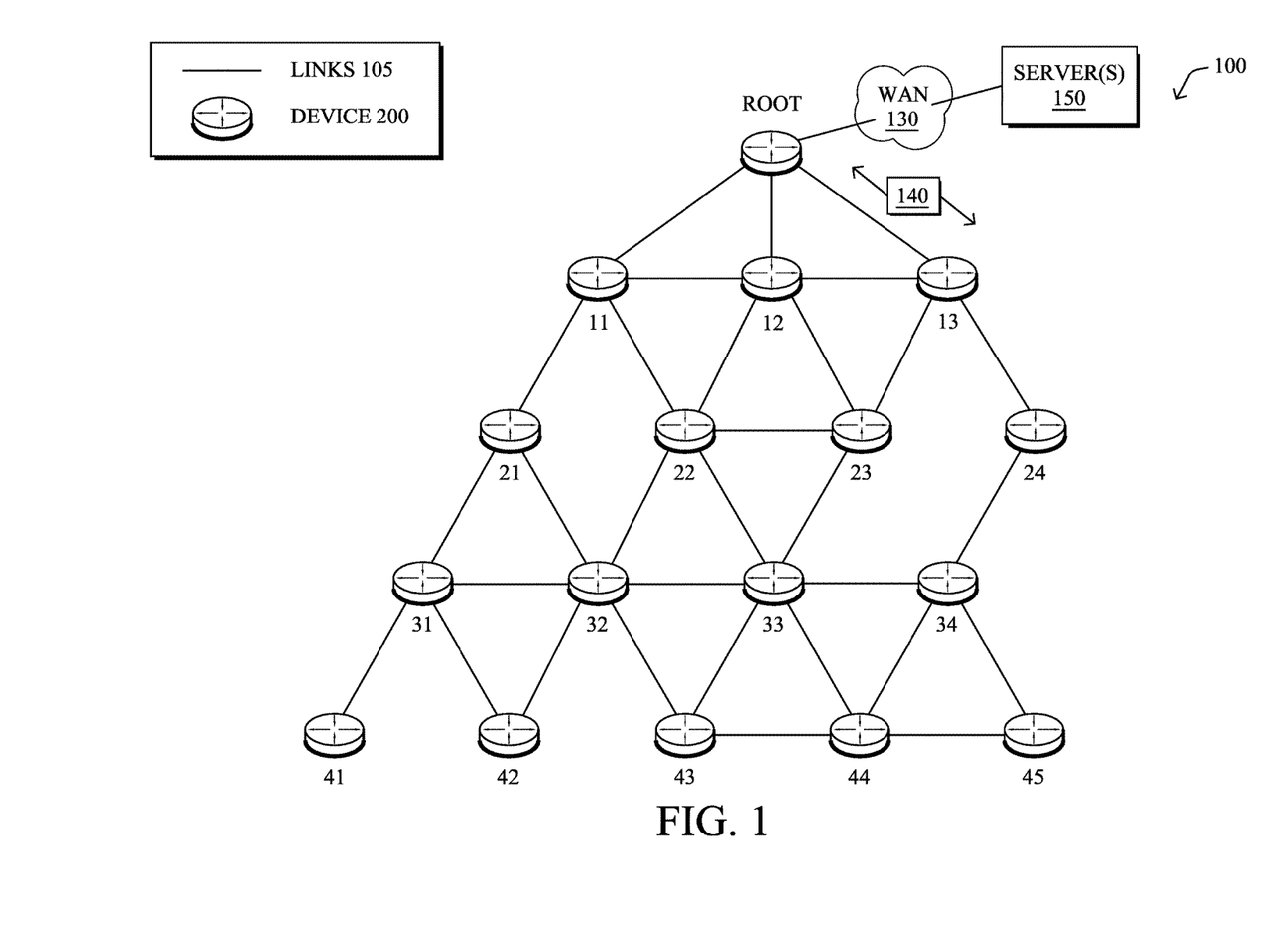
FIG. 1 illustrates an example communication network.

FIG. 1 is a schematic block diagram of an example computer network 100 illustratively comprising nodes/devices 200 (e.g., labeled as shown, "Root," "11," "12," . . . "45," and described in FIG. 2 below) interconnected by various methods of communication. For instance, the links 105 may be wired links or shared media (e.g., wireless links, etc.) where certain nodes 200, such as, e.g., a Root/field area router (FAR), sensors, range extenders, computers, mobile devices, etc., may be in communication with other nodes 200, e.g., based on distance, signal strength, current operational status, location, etc. Those skilled in the art will understand that any number of nodes, devices, links, etc. may be used in the computer network, and that the view shown herein is for simplicity. Also, those skilled in the art will further understand that while the network is shown in a certain orientation, particularly with a "root" node, the network 100 is merely an example illustration that is not meant to limit the disclosure.

Data packets 140 (e.g., traffic and/or messages sent between the devices/nodes) may be exchanged among the nodes/devices of the computer network 100 using predefined network communication protocols such as certain known wired protocols, wireless protocols (e.g., IEEE Std. 802.15.4, WiFi, Bluetooth®, etc.), or other shared-media protocols where appropriate. In this context, a protocol consists of a set of rules defining how the nodes interact with each other.

Figure 2:
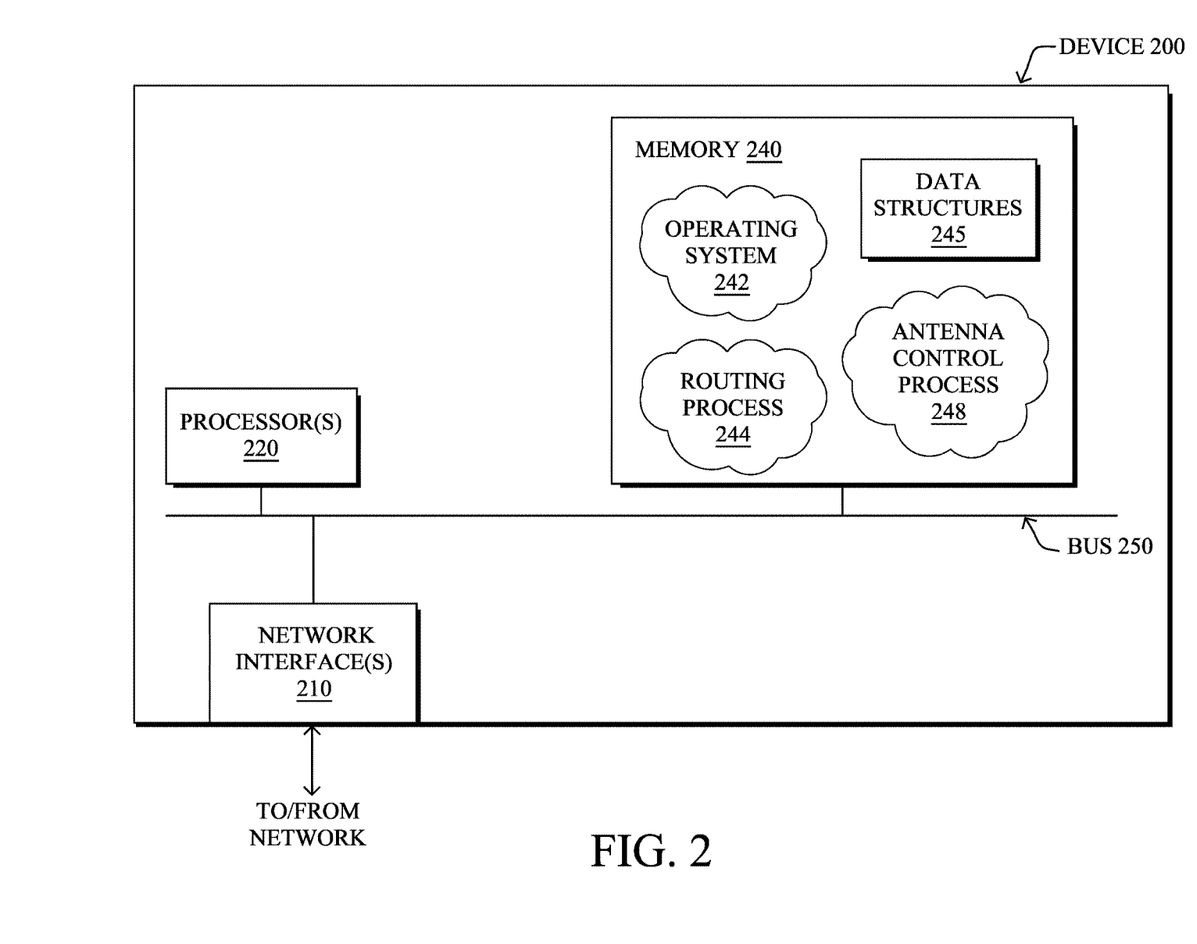
FIG. 2 illustrates an example network device/node.

FIG. 2 is a schematic block diagram of an example node/device 200 that may be used with one or more embodiments described herein, e.g., as any of the nodes shown in FIG. 1 above. The device may comprise one or more network interfaces 210 (e.g., wired, wireless, etc.), at least one processor 220, and a memory 240 interconnected by a system bus 250, as well as a power supply 260 (e.g., battery, plug-in, etc.).

The network interface(s) 210 include the mechanical, electrical, and signaling circuitry for communicating data over links 105 coupled to the network 100. The network interfaces may be configured to transmit and/or receive data using a variety of different communication protocols. Note, further, that the nodes may have two different types of network connections 210, e.g., wireless and wired/physical connections, and that the view herein is merely for illustration.

The memory 240 comprises a plurality of storage locations that are addressable by the processor 220 and the network interfaces 210 for storing software programs and data structures associated with the embodiments described herein. Note that certain devices may have limited memory or no memory (e.g., no memory for storage other than for programs/processes operating on the device and associated caches). The processor 220 may comprise hardware elements or hardware logic adapted to execute the software programs and manipulate the data structures 245. An operating system 242, portions of which are typically resident in memory 240 and executed by the processor, functionally organizes the device by invoking operations in support of software processes and/or services executing on the device. These software processes and/or services may comprise routing process/services 244 and/or an illustrative antenna control process 248, as described herein. Note that while antenna control process 248 is shown in centralized memory 240, alternative embodiments provide for the process to be specifically operated within the network interfaces 210.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while the processes have been shown separately, those skilled in the art will appreciate that processes may be routines or modules within other processes.

Routing process (services) 244 includes computer executable instructions executed by the processor 220 to perform functions provided by one or more routing protocols, such as proactive or reactive routing protocols as will be understood by those skilled in the art. These functions may, on capable devices, be configured to manage a routing/forwarding table (a data structure 245) including, e.g., data used to make routing/forwarding decisions. In particular, in proactive routing, connectivity is discovered and known prior to computing routes to any destination in the network, e.g., link state routing such as Open Shortest Path First (OSPF), or Intermediate-System-to-Intermediate-System (ISIS), or Optimized Link State Routing (OLSR). Reactive routing, on the other hand, discovers neighbors (i.e., does not have an a priori knowledge of network topology), and in response to a needed route to a destination, sends a route request into the network to determine which neighboring node may be used to reach the desired destination. Example reactive routing protocols may comprise Ad-hoc On-demand Distance Vector (AODV), Dynamic Source Routing (DSR), DYnamic MANET On-demand Routing (DYMO), etc. Notably, on devices not capable or configured to store routing entries, routing process 244 may consist solely of providing mechanisms necessary for source routing techniques. That is, for source routing, other devices in the network can tell the less capable devices exactly where to send the packets, and the less capable devices simply forward the packets as directed.

Smart object networks, such as sensor networks, in particular, are a specific type of network having spatially distributed autonomous devices such as sensors, actuators, etc., that cooperatively monitor physical or environmental conditions at different locations, such as, e.g., energy/power consumption, resource consumption (e.g., water/gas/etc. for advanced metering infrastructure or "AMI" applications) temperature, pressure, vibration, sound, radiation, motion, pollutants, etc. Other types of smart objects include actuators, e.g., responsible for turning on/off an engine or perform any other actions. Sensor networks, a type of smart object network, are typically shared-media networks, such as wireless networks. That is, in addition to one or more sensors, each sensor device (node) in a sensor network may generally be equipped with a radio transceiver or other communication port, a microcontroller, and an energy source, such as a battery. Often, smart object networks are considered field area networks (FANs), neighborhood area networks (NANs), etc. Generally, size and cost constraints on smart object nodes (e.g., sensors) result in corresponding constraints on resources such as energy, memory, computational speed and bandwidth.

Notably, mesh networks have become increasingly popular and practical in recent years. In particular, shared-media mesh networks, such as wireless networks, etc., are often on what is referred to as Low-Power and Lossy Networks (LLNs), which are a class of network in which both the routers and their interconnect are constrained: LLN routers typically operate with constraints, e.g., processing power, memory, and/or energy (battery), and their interconnects are characterized by, illustratively, high loss rates, low data rates, and/or instability. LLNs are comprised of anything from a few dozen and up to thousands or even millions of LLN routers, and support point-to-point traffic (between devices inside the LLN), point-to-multipoint traffic (from a central control point such at the root node to a subset of devices inside the LLN) and multipoint-to-point traffic (from devices inside the LLN towards a central control point).

An example implementation of LLNs is an "Internet of Things" network. Loosely, the term "Internet of Things" or "IoT" may be used by those in the art to refer to uniquely identifiable objects (things) and their virtual representations in a network-based architecture. In particular, the next frontier in the evolution of the Internet is the ability to connect more than just computers and communications devices, but rather the ability to connect "objects" in general, such as lights, appliances, vehicles, HVAC (heating, ventilating, and air-conditioning), windows and window shades and blinds, doors, locks, etc. The "Internet of Things" thus generally refers to the interconnection of objects (e.g., smart objects), such as sensors and actuators, over a computer network (e.g., IP), which may be the Public Internet or a private network. Such devices have been used in the industry for decades, usually in the form of non-IP or proprietary protocols that are connected to IP networks by way of protocol translation gateways. With the emergence of a myriad of applications, such as the smart grid, smart cities, and building and industrial automation, and cars (e.g., that can interconnect millions of objects for sensing things like power quality, tire pressure, and temperature and that can actuate engines and lights), it has been of the utmost importance to extend the IP protocol suite for these networks.

An example protocol specified in an Internet Engineering Task Force (IETF) Proposed Standard, Request for Comment (RFC) 6550, entitled "RPL: IPv6 Routing Protocol for Low Power and Lossy Networks" by Winter, et al. (March 2012), provides a mechanism that supports multipoint-to-point (MP2P) traffic from devices inside the LLN towards a central control point (e.g., LLN Border Routers (LBRs) or "root nodes/devices" generally), as well as point-to-multipoint (P2MP) traffic from the central control point to the devices inside the LLN (and also point-to-point, or "P2P" traffic). RPL (pronounced "ripple") may generally be described as a distance vector routing protocol that builds a Directed Acyclic Graph (DAG) for use in routing traffic/packets 140, in addition to defining a set of features to bound the control traffic, support repair, etc. Notably, as may be appreciated by those skilled in the art, RPL also supports the concept of Multi-Topology-Routing (MTR), whereby multiple DAGs can be built to carry traffic according to individual requirements.

Figure 3:
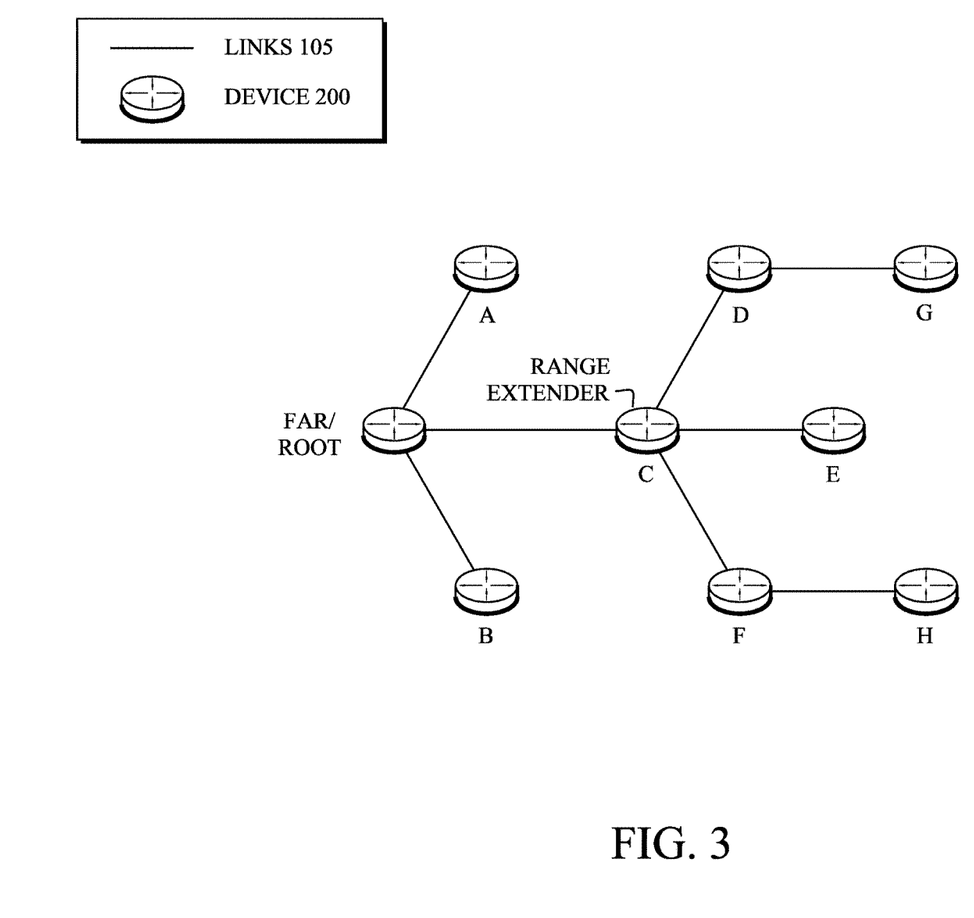
FIG. 3 illustrates an example range extender in a communication network.

As further noted above, some LLN implementations may make use of a range extender, to provide connectivity to remote locations. An example of such a range extender is shown in FIG. 3, according to various embodiments. As shown, consider the case in which nodes D-H are located at a distance from the FAR/Root such that direct communications with the FAR/Root are either impossible or unreliable. For example, the distance between node D and the FAR/Root, in combination with varying weather conditions, obstructions, etc., may be such that any communications between the two device experience a high degree of packet loss, jitter, or the like.

To ensure reliable communications between the distributed nodes in the network and the FAR/Root, a range extender node C may be positioned at an intermediary point. In turn, nodes D-F may attach themselves to range extender node C. Farther away nodes G-H may also attach themselves to nodes between themselves and range extender C. In particular, nodes A-H may form a DAG based on an objective function whereby nodes select a parent node based on link metrics between the node and the parent, in accordance with the routing protocol. For example, node G may select node D as its parent based on the corresponding link between the two devices exhibiting the highest signal strength, least amount of packet loss, etc. As would be appreciated, the topology shown can also change over time due to node movement, changing conditions, etc.

Networking Device with an Electronically Steerable Directional Antenna Array

The techniques herein provide for a networking device to be equipped with an electronically steerable switched element directional antenna array. Such an array allows the device to respond to changes in the deployment of an LLN by adjusting the direction of the radiation beam, to maximize the radio link budget. In some aspects, the antenna elements of the array can be controlled to steer their beams, to cover either four or six sectors of 60° beamwidth without using any moving parts. The antenna array can be mounted directly on the top or bottom of the chassis/housing of a networking device (e.g., under a radome of a a range extender, a router, etc.), which also eliminates the need for external cables and mounting brackets.

Specifically, according to one or more embodiments of the disclosure as described in detail below, a networking device includes a housing, a first plurality of antenna elements coupled to a top or bottom edge of the housing that are continuously enabled, and a second plurality of antenna elements coupled to the top or bottom edge of the housing that are selectively enabled. The networking device further includes control circuitry coupled to the first and second pluralities of antenna elements. The control circuitry is configured to select a first communication direction towards a first neighboring node of the device. The first communication direction is associated with a first subset of the second plurality of antenna elements. The control circuitry is also configured to enable the first subset of the second plurality of antenna elements based on the selected first communication direction. The control circuitry is additionally configured to receive a communication from the first neighboring node. The control circuitry is also configured to select a second communication direction towards a second neighboring node of the device. The second communication direction is associated with a second subset of the second plurality of antenna elements. The control circuitry is further configured to enable the second subset of the second plurality of antenna elements based on the selected second communication direction. The control circuitry is also configured to send the communication towards the second neighboring node via the enabled first plurality of antenna elements and the enabled second subset of the second plurality of antenna elements.

Illustratively, the techniques described herein may be performed by hardware, software, and/or firmware, such as in accordance with the antenna control process 248, which may include computer executable instructions executed by the processor 220 (or independent processor of interfaces 210) to perform functions relating to the techniques described herein, e.g., in conjunction with routing process 244. For example, the techniques herein may be treated as extensions to conventional protocols, such as the various PLC protocols or wireless communication protocols, and as such, may be processed by similar components understood in the art that execute those protocols, accordingly.

Figure 4A:
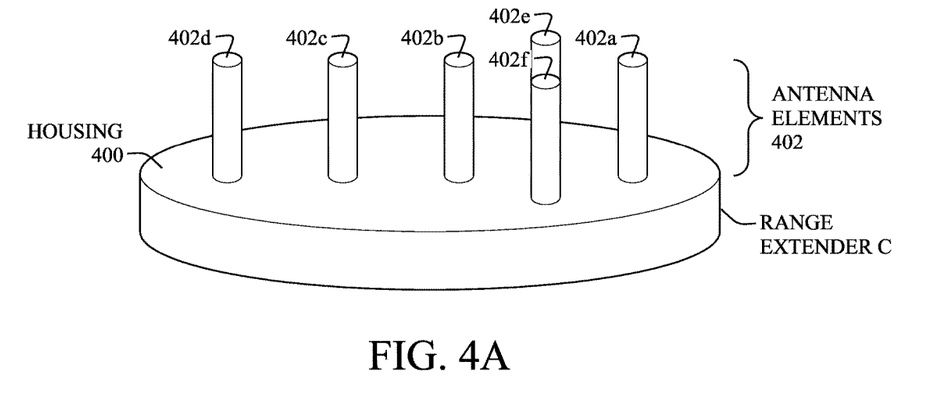
FIGS. 4A-4C illustrate an example networking device with a directional antenna array.
Figure 4B:
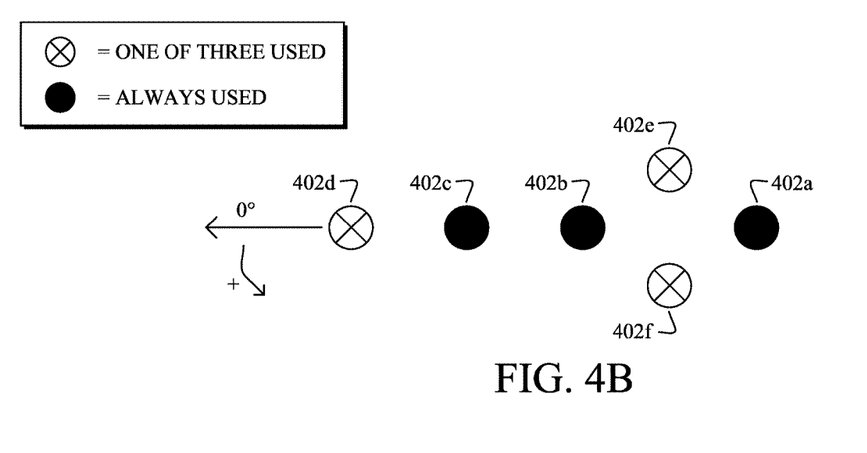
Figure 4C:
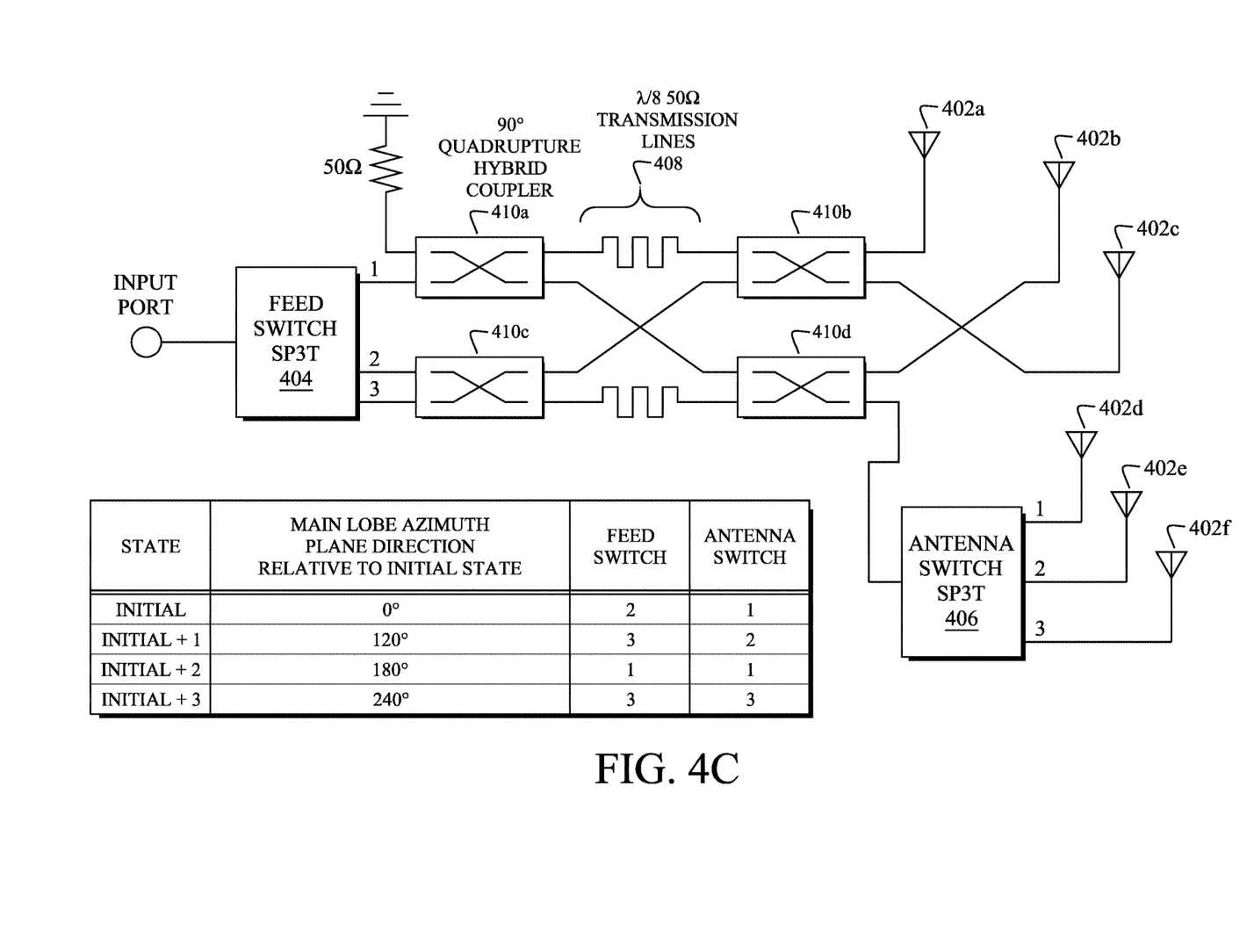

Operationally, an example networking device with a directional antenna array is shown in FIGS. 4A-4C, according to various embodiments. As shown in FIG. 4A, a networking device, e.g., range extender node C, may include a housing 400 and a plurality of antenna elements 402a-402f extending from a surface of housing 400. In various embodiments, antenna elements 402a-402f may extend from a top surface of housing 400 and may be housed within a radome or other protective enclosure (not shown). In other embodiments, antenna elements 402a-402f may alternatively be mounted on a bottom surface of housing 400.

Referring now to FIG. 4B, a schematic diagram of antenna elements 402a-404f are shown, according to various embodiments. In some embodiments, antenna elements 402a-404f may be omnidirectional antennas arranged as a two-dimensional phased array fed by control circuitry. In particular, the electromagnetic fields radiated by each antenna element interfere constructively and destructively to create a radiation pattern that depends on the phase of the signal at each of antenna elements 402a-402f and the location of elements 402a-402f relative to one another.

In various embodiments, as shown, the antenna array may include six antenna elements 402a-402f with four of the elements arranged in a line (e.g., elements 402a-402d) with quarter wavelength spacing. Two additional elements (e.g., elements 402e-402o) may be positioned on opposing sides of the linear arrangement of elements 402a-402d.

During operation of the antenna array, four of the six antenna elements 402a-402f may be enabled/driven at any given time. The other two elements that are not enabled in the array then act as passive directors and reflectors, helping to further shape the overall beam pattern. In particular, a first plurality of antenna elements comprising elements 402a-402c may always be enabled during use. To control the beam pattern of the device, the control circuitry may enable only a subset of the second plurality of antenna elements (e.g., elements 402d-402f). For example, to shape a beam pattern in the 0° direction shown, the control circuitry may also enable antenna element 402d, in addition to enabling antenna elements 402a-402c.

Referring now to FIG. 4C, circuitry for an antenna array is shown, according to various embodiments. In some embodiments, antenna elements 402a-402f may be driven by a Butler matrix beamforming network or other circuitry that performs similar functions. As shown, control switches 404-406 may be operated to control the main lobe azimuth plane direction of the beam, relative to an initial state. Particularly, feed switch 404 may electronically couple an input port to couplers 410a-410d. In one embodiment, couplers 410a-410d may be 90° quadrature hybrid couplers interconnected by transmission lines 408. For example, transmission lines 408 may be 50, 1/8-wavelength connections that connects couplers 410a-410d with the other circuit elements shown. However, other wiring may be used in other designs. The circuitry shown may further include an antenna switch 406 that controls the feed to antenna elements 402d-402f and is coupled to coupler 410d.

Control switches 404-406 may be operated during use of the networking device, to enable different sets of antenna elements 402a-402f. In particular, feed switch 404 may be operated to control the relative phases of the radio frequency (RF) signal fed from the input port to the antenna elements. Antenna switches 406, meanwhile, may control which of antenna elements 402d-402f are driven/enabled, in addition to antenna elements 402a-402c which are always driven/enabled. The direction of the main lobe of the radiation pattern then depends on the settings of control switches 404-406, in combination.

The configuration shown provides four modes with beams at 0°, 120°, 180°, and 240° relative to the linear portion of the array (e.g., linearly arranged antenna elements 402a-402d, as shown in FIG. 4B). Specifically, the angles/modes may be measured in a counterclockwise manner from the 0° axis illustrated in FIG. 4B. Example settings and resulting beam patterns for this configuration are shown below in Table 1, according to various embodiments.

TABLE 1

| Radiation pattern main lobe direction (degrees) | Antenna elements enabled | Phase of signal at each antenna element relative to input (degrees) | Feed switch 404 setting | Antenna switch 406 setting |
| --- | --- | --- | --- | --- |
| 0 | 402a-402d | −90, 135, 0, 135 | 2 | 1 |
| 120 | 402a-402c, 402e | −180, −135, −90, −45 | 3 | 2 |
| 180 | 402a-402d | −135, 0, 135, −90 | 1 | 1 |

TABLE 1-continued

| Radiation pattern main lobe direction (degrees) | Antenna elements enabled | Phase of signal at each antenna element relative to input (degrees) | Feed switch 404 setting | Antenna switch 406 setting |
| --- | --- | --- | --- | --- |
| 240 | 402a-402c, 402f | −180, −135, −90, −45 | 3 | 3 |

For example, consider the case in which the networking device is a range extender. In such a case, the antenna array may be oriented such that the 0° beam would point in the direction of an aggregation node, such as the Root/FAR.

Switches 404-406 may be controlled in any number of ways, according to various embodiments. In some embodiments, switches 404-406 may be coupled to a processor (e.g., processor 220) and controlled via execution of a software process (e.g., antenna control process 248). For example, while the networking device is in a receiving state, the software may operate switches 404-406 to periodically switch the direction of the antenna, while listening for transmitting end devices. When a signal is detected, the software can then select the best antenna setting based on factors such as the signal strength of the received signal. In turn, the software can also switch the direction of the antenna towards a Root/FAR node, to backhaul collected data. In other embodiments, some or all of the control operations may be implemented in hardware, such as an application-specific integrated circuit (ASIC), a field programmable gate array (FPGA), a system-on-a-chip (SoC), or the like.

Referring now to FIGS. 5A-5D, example radiation patterns are shown of the networking device of FIGS. 4A-4C, according to various embodiments. In particular, a prototype of the networking device described with respect to FIGS. 4A-4C was constructed and tested by providing a 915 MHz, continuous-wave (CW) RF signal to the input port shown in FIG. 4C. During testing, it was observed that the gain was lower than that in simulation due to losses inherent to the circuit board and transmission lines (e.g., due to cabling connecting to the board of the prototype array, circuit board components such as switches and hybrid couplers, etc.).

Figure 5A:
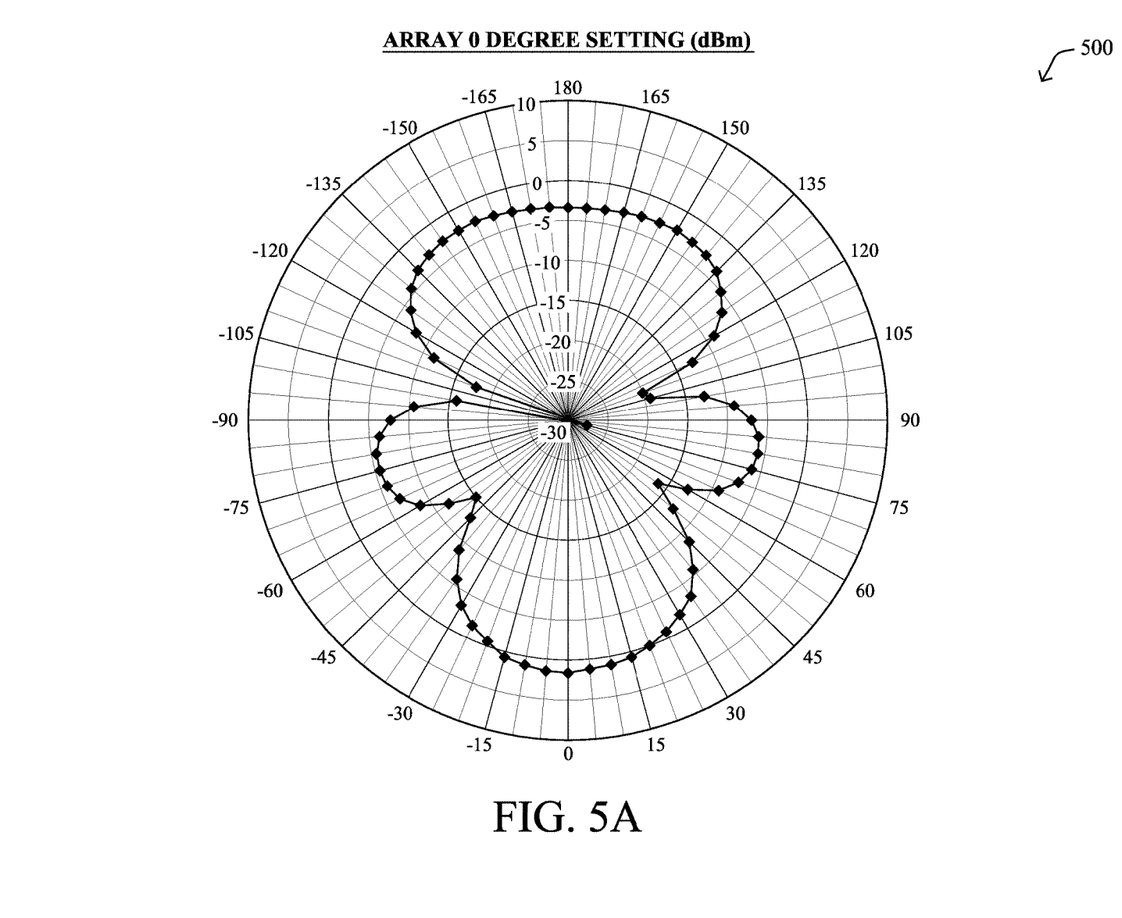
FIGS. 5A-5D illustrate radiation patterns of the networking device of FIGS. 4A-4C.

In FIG. 5A, the antenna array was operated in the 0° mode shown in Table 1. In particular, antenna switch 406 was operated to enable antenna element 402d, in addition to antenna elements 402a-402c, which are always enabled. Feed switch 404 was likewise operated to provide the enabled antenna elements 402a-402d with the RF signal at the following phases, respectively: −90°, 135°, 0°, 135°. In doing so, the antenna array exhibited the radiation pattern 500 shown. As illustrated, radiation pattern 500 demonstrates a main lobe (e.g., the lobe with the highest gain) substantially in the 0° direction along the linearly arranged antenna elements 402a-402d (e.g., as shown in FIG. 4B).

Figure 5B:
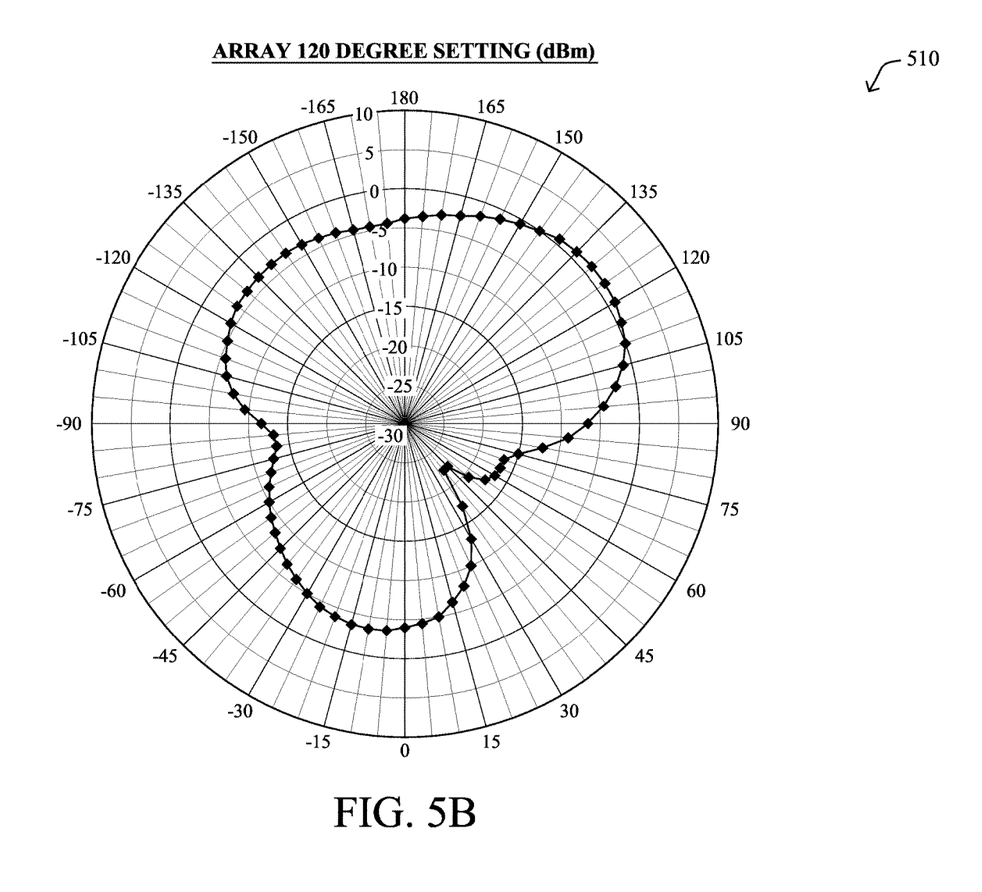

In FIG. 5B, the antenna array was operated in the 120° mode shown in Table 1. In particular, antenna switch 406 was operated to enable antenna element 402e, in addition to antenna elements 402a-402c, which are always enabled. Feed switch 404 was likewise operated to provide the enabled antenna elements 402a-402c and 402e with the RF signal at the following phases, respectively: −180°, −135°, −90°, −45°. In doing so, the antenna array exhibited the radiation pattern 510 shown. As illustrated, radiation pattern 510 demonstrates a main lobe substantially in the 120° direction relative to the 0° direction shown in FIG. 4B.

Figure 5C:
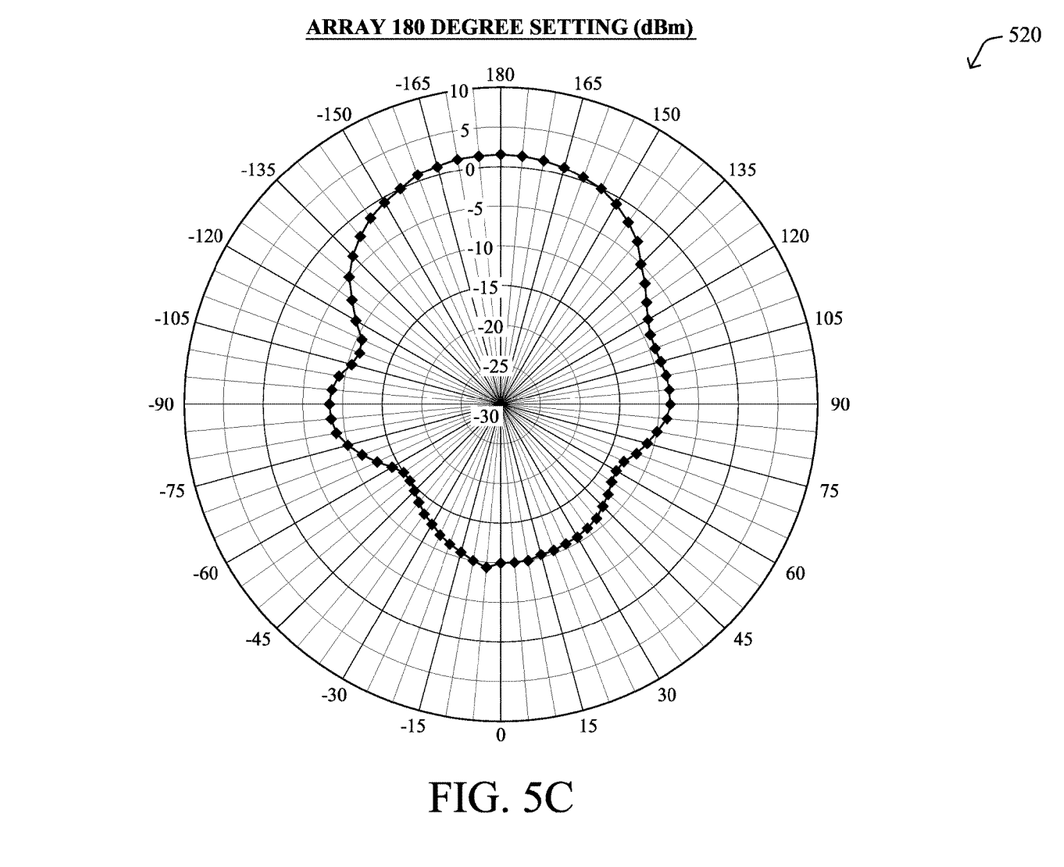

In FIG. 5C, the antenna array was operated in the 180° mode shown in Table 1. In particular, similar to the 0° setting, antenna switch 406 was operated to enable antenna element 402*d*, in addition to antenna elements 402*a*-402*c*, which are always enabled. In the 180° setting, however, feed switch 404 is operated to provide the RF signal to the enabled antenna elements 402*a*-402*d* with the following phases, respectively: −135°, 0°, 135°, −90°. In doing so, the antenna array exhibited the radiation pattern 520 shown. As illustrated, radiation pattern 520 demonstrates a main lobe substantially in the 180° direction relative to the 0° direction shown in FIG. 4B.

Figure 5D:
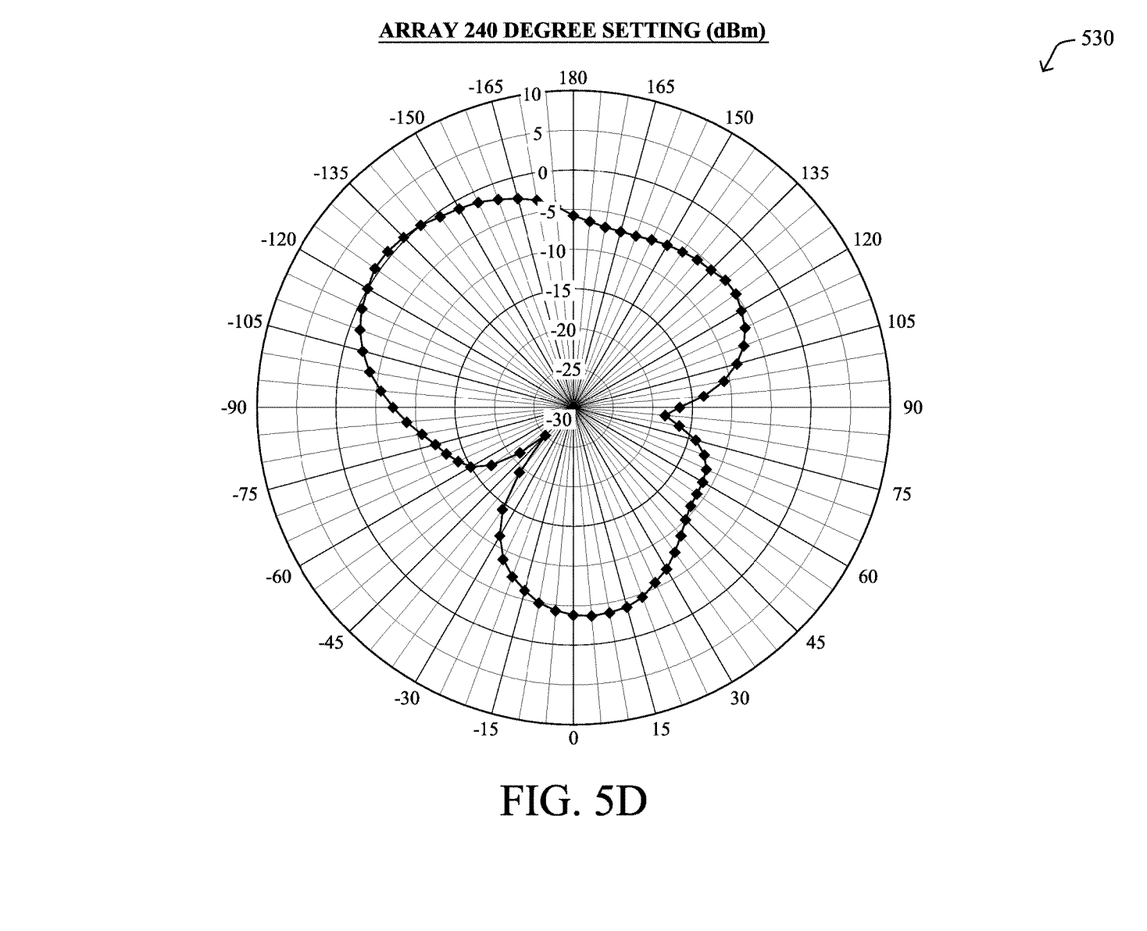

In FIG. 5D, the antenna array was operated in the 240° mode shown in Table 1. In particular, antenna switch 406 was operated to enable antenna element 402*f*, in addition to antenna elements 402*a*-402*c*, which are always enabled. In the 240° setting, however, feed switch 404 is operated to provide the RF signal to the enabled antenna elements 402*a*-402*c* and 402*f* with the following phases, respectively: −180°, −135°, −90°, −45°. In doing so, the antenna array exhibited the radiation pattern 530 shown. As illustrated, radiation pattern 530 demonstrates a main lobe substantially in the 240° direction relative to the 0° direction shown in FIG. 4B.

Figure 6A:
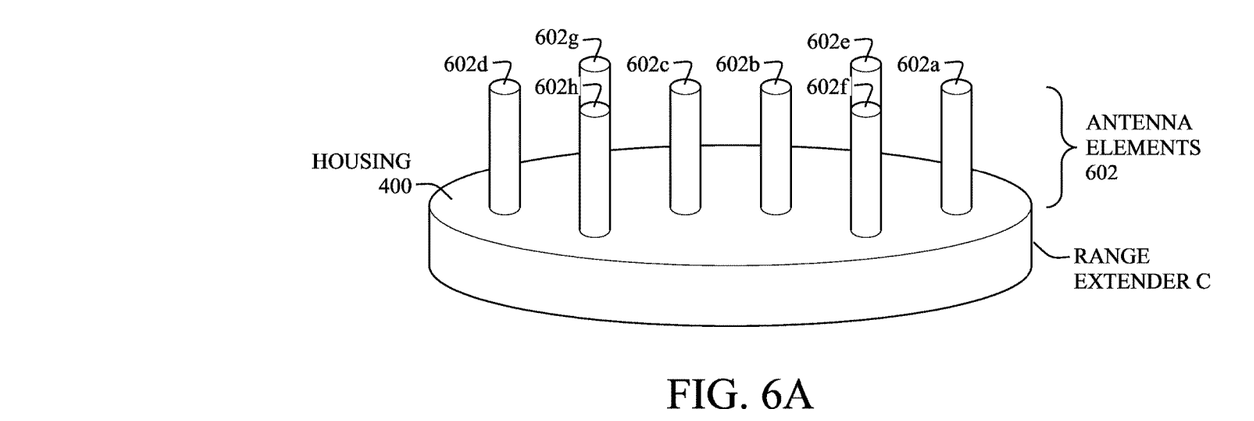
FIGS. 6A-6C illustrate an example networking device with an alternate directional antenna array configuration.
Figure 6B:
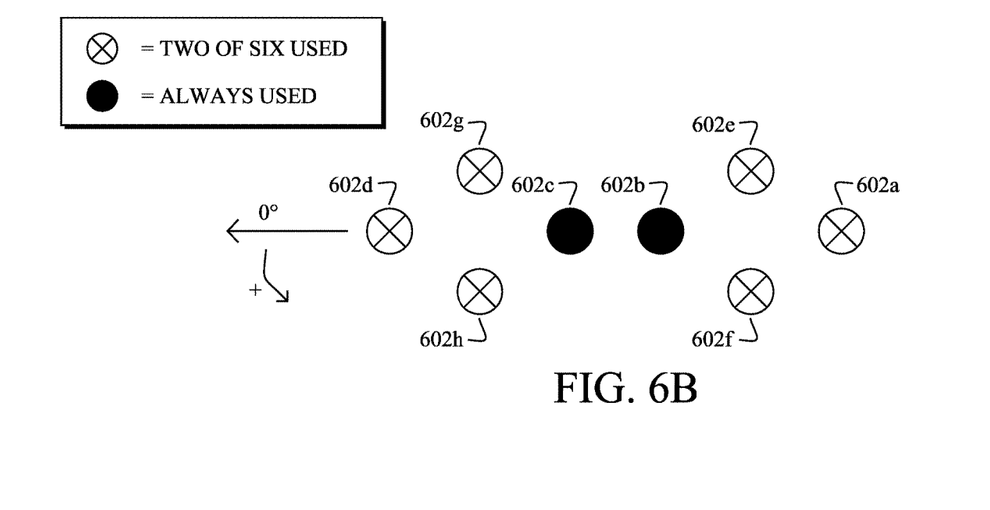
Figure 6C:
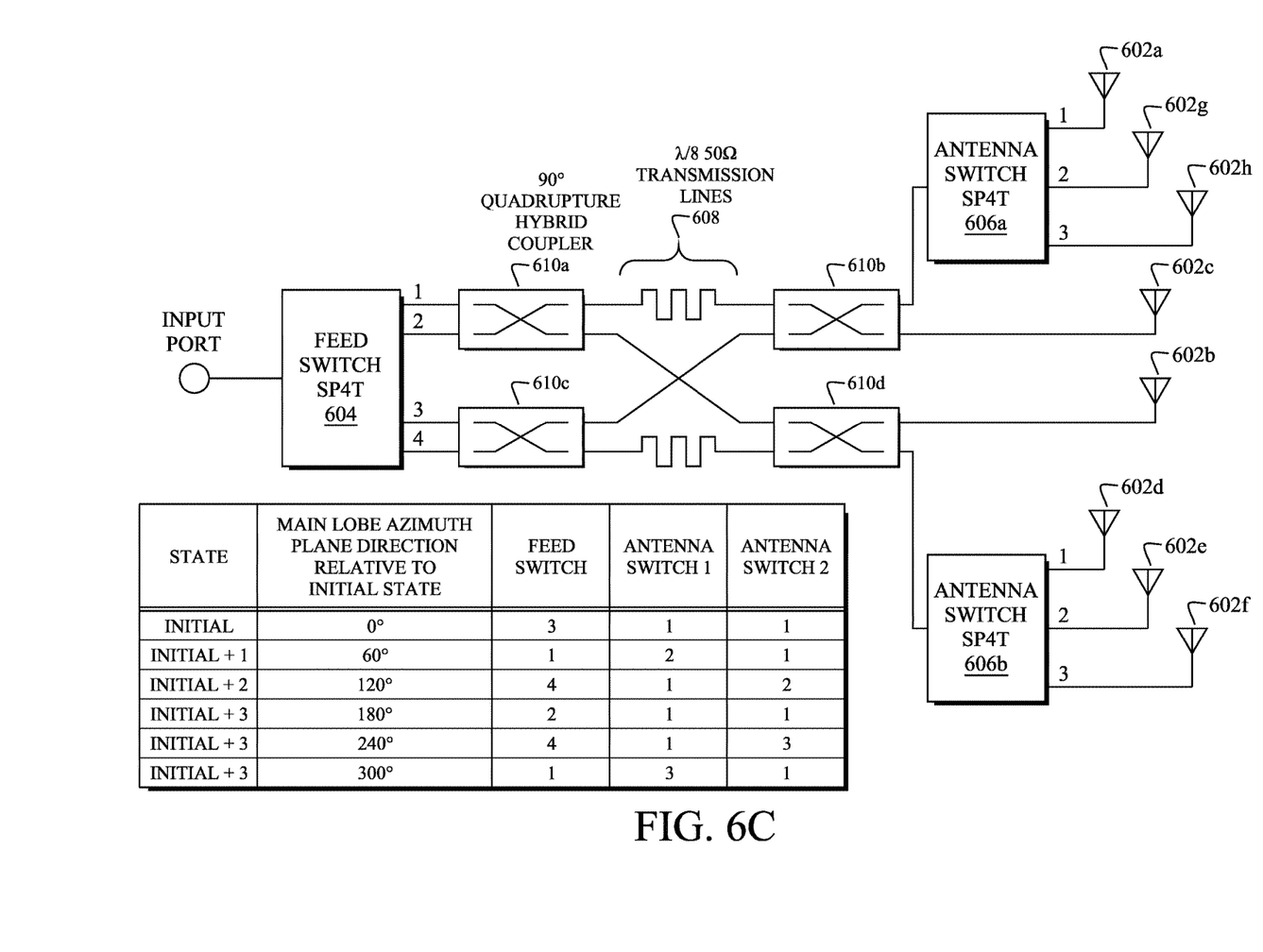

Referring now to FIGS. 6A-6C, an example networking device with an alternate directional antenna array configuration is shown, according to various embodiments. In contrast to the six-element configuration shown in FIGS. 4A-4C, other embodiments provide for the use of an eight-element array. Particularly, as shown in FIG. 6A, range extender C or another networking device such as a router may comprise eight antenna elements 602*a*-602*h* coupled to a top edge of housing 400 or, alternatively, to a bottom edge of housing 400.

As shown in FIG. 6B, antenna elements 602*a*-602*d* may be linearly disposed with e.g., quarter wavelength spacing. Antenna elements 602*e*-602*h* may be positioned as shown thereby surrounding antenna elements 602*b*-602*c*. During operation, four of the eight antenna elements 602*a*-602*h* may be enabled at any given time. The other remaining antenna elements may act as passive directors and reflectors. For example, antenna elements 602*b*-602*c* may be continuously enabled and two additional antenna elements may be enabled selectively from the remaining set of elements 602*a* and 602*d*-602*h*.

In FIG. 6C, example circuitry is shown to provide control over antenna elements 602*a*-602*h*. Generally, the circuitry shown may operate in a similar manner to the circuitry illustrated in FIG. 4C. Notably, a feed switch 604 may couple an input port to 90° quadrature hybrid couplers 610*a*-610*d* via transmission lines 608. Lines 608 may be 50Ω, 1/8 wavelength lines or have different properties selected as desired. In contrast to the circuitry of FIG. 4C, the circuitry shown may include two antenna switches 606*a* and 606*b* that selectively enable different groups of antenna elements 602. In particular, antenna switch 606*a* may selectively couple antenna elements 602*a* and 602*g*-602*h* to couplers 610. Similarly, antenna switch 606*b* may selectively enable antenna elements 602*d*-602*f*. In contrast, antenna elements 602*b*-602*c* may be coupled directly to couplers 610, thereby enabling antenna elements 602*b*-602*c* at all times. This configuration provides six modes with beams at 60 degree increments, thus covering the full azimuth plane.

As noted, four of antenna elements 602 may be enabled during any given operational state while the other four elements act as passive directors and reflectors. For example, in one operational state, antenna switches 606*a*-606*b* may be controlled to enable antenna elements 602*a* and 602*d*, in combination with antenna elements 606*b*-606*c* which are always enabled. Similar to the design depicted in FIG. 4B, the lobe directions for the array shown in FIG. 6B may be measured in a counterclockwise manner from the 0° axis shown. An example listing of the various operational states for the array is shown below in Table 2.

TABLE 2

| Radiation pattern main lobe direction (degrees) | Antenna elements enabled | Phase of signal at each antenna element relative to input (degrees) | Feed switch 604 setting | Antenna switch 606a setting | Antenna switch 606b setting |
|---|---|---|---|---|---|
| 0 | 602a-602d | −90, 135, 0, −135 | 2 | 1 | 1 |
| 60 | 602b-602d, 602g | −45, −90, −135, −180 | 4 | 2 | 1 |
| 120 | 602a-602c, 602e | −180, −135, −90, −45 | 1 | 1 | 2 |
| 180 | 602a-602d | −135, 0, 135, −90 | 3 | 1 | 1 |
| 240 | 602a-602c, 602f | −180, −135, −90, −45 | 1 | 1 | 3 |
| 300 | 602b-602d, 602h | −45, −90, −135, −180 | 4 | 3 | 1 |

For example, assume that the networking device is a range extender that is aligned such that the nearest Root/FAR is along the 0° communication direction. In such a case, the device may use any or all of the other five remaining directions, to communicate with the other neighboring nodes (e.g., to relay communications to and from the FAR).

Figure 7:
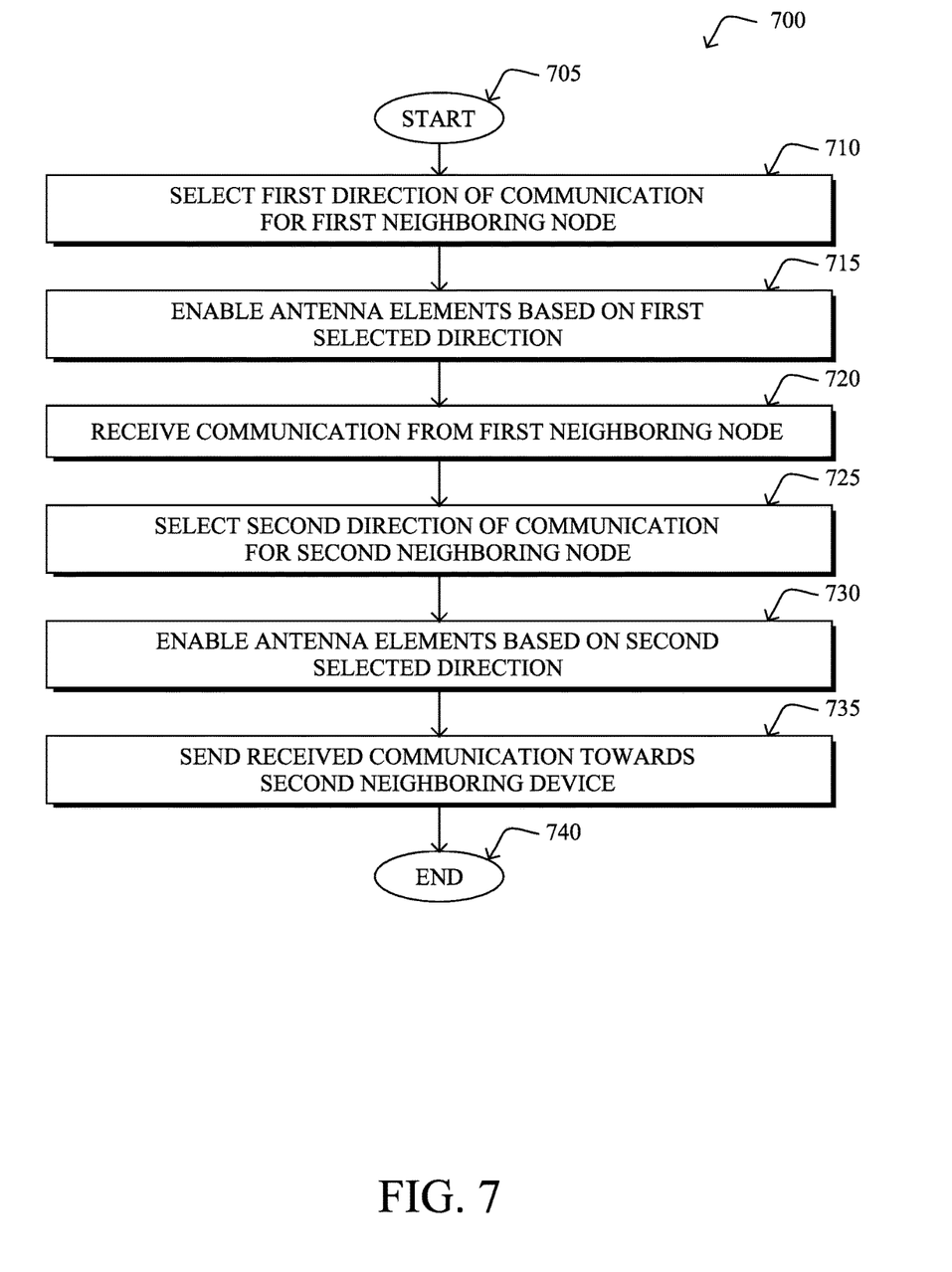
FIG. 7 illustrates an example simplified procedure for operating a networking device with a directional antenna array.

FIG. 7 illustrates an example simplified procedure for operating a networking device with a directional antenna array, in accordance with one or more embodiments herein. Generally, procedure 700 may be performed by a networking device (e.g., a range extender, router, etc.) equipped with an antenna array, as described herein. Such an antenna array may include a first plurality of antenna elements that are continuously enabled and a second plurality of antenna elements that are selectively enabled. The procedure 700 may begin at step 705 and continue on to step 710 where, as described in greater detail above, the device may select a first direction of communication for a first neighboring device. In some embodiments, the device may associate the first neighboring device with the direction based on prior communications with the node. For example, the device may associate the first neighboring node with the first direction based on the signal strength of communications received by the device from the first neighboring node (e.g., a neighbor discovery request message, etc.).

At step 715, as detailed above, the device may enable antenna elements of its antenna array based on the selected direction. In some embodiments, the device may enable a first subset of the second plurality of selectably-enabled antenna elements based on the direction of communication. For example, if the device is equipped with a six-element array, the device may continuously enable three antenna elements and selectively enable another one of the remaining three elements in the array, for a total of four enabled elements at any given time. In another example, if an eight-element array is used, the device may continuously enable two of the antenna elements and selectively enable another two of the remaining six elements, to control the direction of the beam.

At step 720, the device may receive a communication from the first neighboring node, as described in greater detail above. In some embodiments, the device may receive the communication substantially along the first communication direction. For example, if the device is a range extender, the device may receive a communication to pass from one neighbor to another neighbor.

At step 725, as detailed above, the device may select a second communication direction of communication for a second neighboring node. In some embodiments, the first or second neighboring node may be a Root/FAR node in the network and the other node may communicate with the Root/FAR via the device. In further embodiments, the device itself may be a router, such as a FAR, that routes communications between a plurality of neighboring devices.

At step 730, the device may enable its antenna elements based on the second selected communication direction, as described in greater detail above. In some embodiments, if the device comprises a set of selectively enabled antenna elements and the device enabled a first subset of these elements based on the first communication direction, the device may enable a different subset of these elements to communication along the second communication direction. For example, in a six-element array, the device may selectively enable one of three different elements, while continuously enabling the other three elements. Similarly, if the array includes eight elements, the device may continuously enable two of the elements, while selectively enabling another two of the remaining six elements, depending on the direction of communication.

At step 735, as detailed above, the device, may send the received communication towards the second neighboring device via the second selected direction. In particular, after enabling the corresponding antenna elements in step 730, the device may transmit the received communication in the selected second direction using the enabled antenna elements. Procedure 700 then ends at step 740. As would be appreciated, the networking device may repeat procedure 700 any number of times (e.g., to relay communications between different sets of network nodes, etc.).

It should be noted that while certain steps within procedure 700 may be optional as described above, the steps shown in FIG. 7 are merely examples for illustration, and certain other steps may be included or excluded as desired. Further, while a particular order of the steps is shown, this ordering is merely illustrative, and any suitable arrangement of the steps may be utilized without departing from the scope of the embodiments herein.

The techniques described herein, therefore, provide for an antenna array of a networking device that has a higher gain than an omnidirectional antenna with the same elevation beamwidth, allowing the device to cover a longer range using the same amount of transmission power. In some aspects, the array may also be electronically steerable, allowing the beam to cover a wider azimuthal (e.g., horizontal) angular area than that of a single directional antenna. Software and/or hardware control of the beam direction may allow the device to quickly adapt to changing network conditions, such as mobile end nodes, adding or removing end nodes from the network, interference, changes in RF propagation due to moving objects, weather conditions, etc. Further, the antenna arrays disclosed herein are smaller and simpler than traditional steerable phased arrays that could steer a beam in all of the four or six directions. Such arrays often require more than six or eight elements, variable phase shifters, more complex software control, and are more costly. Additionally, the elements of the array may be enclosed within a single radome and mounted directly to an outdoor networking device, eliminating the need for a user to purchase additional equipment (e.g., external RF cables, antenna mounting brackets, etc.) or require additional space to support multiple directional antennas (e.g., on a pole, on a tower, etc.).

While there have been shown and described illustrative embodiments that provide for a networking device with a steerable antenna array, it is to be understood that various other adaptations and modifications may be made within the spirit and scope of the embodiments herein. For example, the embodiments have been shown and described herein with relation to specific antenna element configurations. However, as would be appreciated, any number of antenna elements in any number of different layouts may be used, in other embodiments, without deviating from the teachings herein.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A networking device comprising:
a housing;
a first plurality of antenna elements coupled to a top or bottom edge of the housing that are continuously enabled;
a second plurality of antenna elements coupled to the top or bottom edge of the housing that are selectively enabled; and
control circuitry coupled to the first and second pluralities of antenna elements and configured to:
 select a first communication direction towards a first neighboring node of the device, wherein the first communication direction is associated with a first subset of the second plurality of antenna elements;
 enable the first subset of the second plurality of antenna elements based on the selected first communication direction;
 receive a communication from the first neighboring node;
 select a second communication direction towards a second neighboring node of the device, wherein the second communication direction is associated with a second subset of the second plurality of antenna elements;
 enable the second subset of the second plurality of antenna elements based on the selected second communication direction; and
 send the communication towards the second neighboring node via the enabled first plurality of antenna elements and the enabled second subset of the second plurality of antenna elements.

2. The networking device as in claim 1, wherein the first neighboring node or the second neighboring node comprises a field area router of a low power and lossy network.

3. The networking device as in claim 1, the first plurality of antenna elements consisting of three linearly arranged antenna elements located between the second plurality of antenna elements.

4. The networking device as in claim 3, the second plurality of antenna elements consisting of three antenna elements, wherein one of the three antenna elements of the second plurality is arranged linearly with the first plurality of antenna elements.

5. The networking device as in claim 3, the second plurality of antenna elements consisting of six antenna elements, wherein two of the six antenna elements of the second plurality are arranged linearly with the first plurality of antenna elements.

6. The networking device as in claim 1, the first plurality of antenna elements consisting of two antenna elements located between the second plurality of antenna elements.

7. The networking device as in claim 1, wherein the control circuitry is further configured to:
periodically switch between enablement of different subsets of the second plurality of antenna elements to scan for transmitting devices.

8. The networking device as in claim 1, wherein the networking device is a wireless range extender.

9. The networking device as in claim 1, wherein the networking device is a router.

10. A method, comprising:
selecting, by control circuitry of a networking device comprising a first plurality of continuously enabled antenna elements and a second plurality of selectively enabled antenna elements, a first communication direction towards a first neighboring node of the device, wherein the first communication direction is associated with a first subset of the second plurality of antenna elements;
enabling, by the control circuitry, the first subset of the second plurality of antenna elements based on the selected first communication direction;
receiving, by the control circuitry, a communication from the first neighboring node;
selecting, by the control circuitry, a second communication direction towards a second neighboring node of the device, wherein the second communication direction is associated with a second subset of the second plurality of antenna elements;
enabling, by the control circuitry, the second subset of the second plurality of antenna elements based on the selected second communication direction; and
sending the communication towards the second neighboring node via the enabled first plurality of antenna elements and the enabled second subset of the second plurality of antenna elements.

11. The method as in claim 10, wherein the first neighboring node or the second neighboring node comprises a field area router of a low power and lossy network.

12. The method as in claim 10, the first plurality of antenna elements consisting of three linearly arranged antenna elements located between the second plurality of antenna elements.

13. The method as in claim 12, the second plurality of antenna elements consisting of three antenna elements, wherein one of the three antenna elements of the second plurality is arranged linearly with the first plurality of antenna elements.

14. The method as in claim 12, the second plurality of antenna elements consisting of six antenna elements, wherein two of the six antenna elements of the second plurality are arranged linearly with the first plurality of antenna elements.

15. The method as in claim 10, the first plurality of antenna elements consisting of two antenna elements located between the second plurality of antenna elements.

16. The method as in claim 10, comprising:
periodically switching between enablement of different subsets of the second plurality of antenna elements to scan for transmitting devices.

17. The method as in claim 10, wherein the networking device is a wireless range extender.

18. The method as in claim 10, wherein the networking device is a router.

* * * * *

UNITED STATES PATENT AND TRADEMARK OFFICE
CERTIFICATE OF CORRECTION

PATENT NO. : 9,615,266 B1  
APPLICATION NO. : 15/089836  
DATED : April 4, 2017  
INVENTOR(S) : Christopher A. Cheadle et al.

Page 1 of 1

It is certified that error appears in the above-identified patent and that said Letters Patent is hereby corrected as shown below:

In the Specification

In Column 7, Line 31, please amend as shown:
transmission lines 408 may be 50Ω, 1/8-wavelength connec- Signed and Sealed this  
Nineteenth Day of January, 2021

Andrei Iancu  
*Director of the United States Patent and Trademark Office*